United States Patent [19]
Nakamura

[11] Patent Number: 5,457,805
[45] Date of Patent: Oct. 10, 1995

[54] MICROCOMPUTER ENABLING HIGH SPEED EXECUTION OF PRODUCT-SUM OPERATION

[75] Inventor: Kimiko Nakamura, Tokyo, Japan

[73] Assignee: NEC Corporation, Tokyo, Japan

[21] Appl. No.: 85,205

[22] Filed: Jun. 29, 1993

[30] Foreign Application Priority Data

Jun. 30, 1992 [JP] Japan ................................. 4-172228
Jul. 9, 1992 [JP] Japan ................................. 4-182008

[51] Int. Cl.$^6$ ................................................. G06F 7/52
[52] U.S. Cl. ............... 395/800; 364/750.5; 364/DIG. 1; 364/258; 364/258.2
[58] Field of Search ............................ 395/800; 364/767, 364/750.5, 736, 754, 757

[56] References Cited

U.S. PATENT DOCUMENTS

| | | | |
|---|---|---|---|
| 4,958,312 | 9/1990 | Ang et al. | 364/754 |
| 5,095,456 | 3/1992 | Wong et al. | 364/757 |
| 5,133,069 | 7/1992 | Asato et al. | 395/800 |
| 5,144,574 | 9/1992 | Monta | 364/754 |
| 5,212,782 | 5/1993 | Asato et al. | 395/500 |
| 5,218,564 | 6/1993 | Covey | 364/750.5 |
| 5,231,601 | 7/1993 | Stearns | 364/757 |
| 5,291,431 | 3/1994 | Ho et al. | 364/760 |

*Primary Examiner*—Mehmet Geckil
*Attorney, Agent, or Firm*—Whitham, Curtis, Whitham & McGinn

[57] ABSTRACT

A microcomputer of the present invention includes a multiplication circuit for multiplication of a multiplier and a multiplicand data, a ripple carry adder for addition of the data and the carry from the multiplication circuit and addition of the multiplication results, a multiplication result holding register to hold the multiplication result obtained by the addition of said data and the carry from the ripple carry adder, a product-sum operation result holding register to hold the product-sum operation result obtained by addition of the multiplication results at the ripple carry adder, a selector to selectively input the data or the carry from the multiplication circuit or the multiplication result held at the multiplication result holding register to the ripple carry adder, a second selector to selectively input the data or the carry from the multiplication circuit or the product-sum operation result held at the product-sum operation result holding register to the ripple carry adder and a third selector to selectively output the multiplication result or the product-sum operation result held at the multiplication result holding register or the product-sum operation result holding register.

11 Claims, 6 Drawing Sheets

5,457,805

MICROCOMPUTER ENABLING HIGH SPEED EXECUTION OF PRODUCT-SUM OPERATION

BACKGROUND OF THE INVENTION

1. Field of the Invention

The present invention relates to a microcomputer, and particularly relates to a microcomputer having a product-sum operation instruction which repeats multiplication and addition for a predetermined number of times.

2. Description of the Prior Art

Referring to FIG. 6, the method to execute a product-sum operation instruction in a conventional microcomputer will be described below. To simplify the description, it is supposed here that the data needed for operations including multipliers and multiplicands are read from a register group 401 comprising a plurality of registers. The subject register address is supposed to be given to a register address bus 402. The multiplication is made according to the secondary Booth algorithm and the data have 16 bits.

Firstly, a multiplier data is read from the register group 401 and sent to a temporary register 403. The multiplier data read to the temporary register 403 is decoded by a Booth decoder 404. A multiplicand data read from the register group 401 is modified by the decoded value and written to a temporary register 405.

In the multiplication of 16-bit data using the secondary Booth algorithm, eight partial products are determined so that they are added with a shift of two bits for each.

According to the secondary Booth algorithm, a 16-bit multiplier data (Y) is expressed as follows:

$$Y = \Sigma(-2Y_{2j+1} + Y_{2j} + Y_{2j-1})$$

Decoding of a multiplier data by the Booth decoder 404 is to determine $(-2y_{2j+1} + y_{2j} + y_{2j-1})$ in the above expression. The result will become either 0, ±1 or ±2. Modification of a multiplicand data (X) by the above decoded value is to determine either 0, ±X or ±2X depending on the result of decoding. Eight partial products are the values 0, ±X or ±2X, as a result of modification by the decoded value.

The first partial product is written to a temporary register 407. For the remaining partial product, the multiplicand data is similarly modified by the value at the Booth decoder 404 and repeatedly shifted for 2 bits by a shift register 406. The contents of the shift register 406 and the temporary register 407 are added at an ALU 408. The result obtained from the addition at the ALU 408 is written to the temporary register 407.

Thus, the multiplicand data is modified by the value at the Booth decoder 404 and repeatedly shifted and added so that the multiplication result is determined. The multiplication result is, via an internal data bus 105, written to the register group 401.

After the next set of multiplier and multiplicands is similarly processed to determine the next multiplication result, the previous multiplication result is read from the register group 401 via a data bus 409.

At the same time, the current multiplication result written to the temporary register 407 is read via another data bus 410 and input to the ALU 408 for addition processing.

By repeating the above processing for a predetermined number of times, a product-sum operation instruction is executed. The final product-sum operation result is temporarily held at a register 420 and written to the register group 401 via the internal data bus.

As described above, in a conventional microcomputer, a product-sum operation is executed by microprogram control where the multiplicand data is processed to determine partial products, which are repeatedly shifted for 2 bits and added for multiplication. With the result being temporarily held, the next multiplication is made. After the determination of the next multiplication result, the previous multiplication result is read out again for addition. Such a procedure prolongs the execution time of a product-sum operation.

For microcomputers, a higher speed product-sum operation is strongly desired. With the conventional microprogram control method, however, it is difficult to improve the speed remarkably.

SUMMARY OF THE INVENTION

A first object of the present invention is to provide a microcomputer with a simple configuration capable of product-sum operation during a time period corresponding to half or one third of the effective clocks required for the product-sum operation using microprogram control.

A second object of the present invention is to provide a microcomputer capable of saturation for product-sum operation in addition to the above object.

According to a preferred embodiment of the present invention to attain the first object above, a microcomputer comprises a multiplication circuit for multiplication of a multiplier and a multiplicand data, a ripple carry adder for addition of the data and the carry from the multiplication circuit as well as addition of the multiplication results, a first holding means to hold the multiplication result obtained by the addition of the carry and the data at the ripple carry adder, a second holding means to hold the product-sum operation result obtained by addition of the multiplication results from the ripple carry adder, a first selection means which selectively inputs the carry or the data from the multiplication circuit and the multiplication result held at the first holding means to the ripple carry adder, a second selection means which selectively inputs the carry or data from the multiplication circuit and the product-sum operation result held at the second holding means to the ripple carry adder, and an output data control means which selectively outputs the multiplication result or the product-sum operation result held at the first holding means or the second holding means.

According to another preferred embodiment of the present invention to attain the second object above, a microcomputer comprises a multiplication circuit for multiplication of a multiplier and a multiplicand data, a ripple carry adder for addition of the data and the carry from the multiplication circuit as well as addition of the multiplication results, a first holding means to hold the multiplication result obtained by the addition of the carry and the data at the data in the ripple carry adder, a second holding means to hold the product-sum operation result obtained by addition of the multiplication results from the ripple carry adder, a first selection means which selectively inputs the carry or the data from the multiplication circuit and the multiplication result held at the first holding means to the ripple carry adder, a second selection means which selectively inputs the carry or data from the multiplication circuit and the product-sum operation result held at the second holding means to the ripple carry adder, and an output data control means which selectively outputs the multiplication result or the product-sum operation result held at the first holding means or the second holding means, and the output data control means further comprises a judgment means to judge whether the product-sum operation result in the second holding means overflows or underflows, so as to output the product-sum operation result at the second holding means when the judgment means judges that neither of an overflow nor an underflow occurs for the product-sum operation result, the positive maximum value for the operation word length when an overflow occurs and the negative maximum value for the operation word length when an underflow occurs.

According to a further preferred embodiment, the judgment means of the output data control means receives the overflow flag from the ripple carry adder and, if the overflow flag is "1", judges that an overflow occurs when the most significant bit of the product-sum operation result in the second holding means is "1" and that an underflow occurs when the most significant bit of the product-sum operation result in the second holding means is "0". The microcomputer further comprises a constant generation circuit which generates the positive or negative maximum value for the operation word length in advance.

According to a another preferred embodiment, the microcomputer further comprises a third selection means between the ripple carry adder and the second holding means to selectively store the product-sum operation result from the ripple carry adder or the data from the internal data bus to the second holding means.

Other objects, characteristics and effects of the present invention will be clarified in the detailed description below.

DESCRIPTION OF THE PREFERRED EMBODIMENT

Referring to the attached figures, preferred embodiments of the present invention will be described in detail below.

Figure 1:
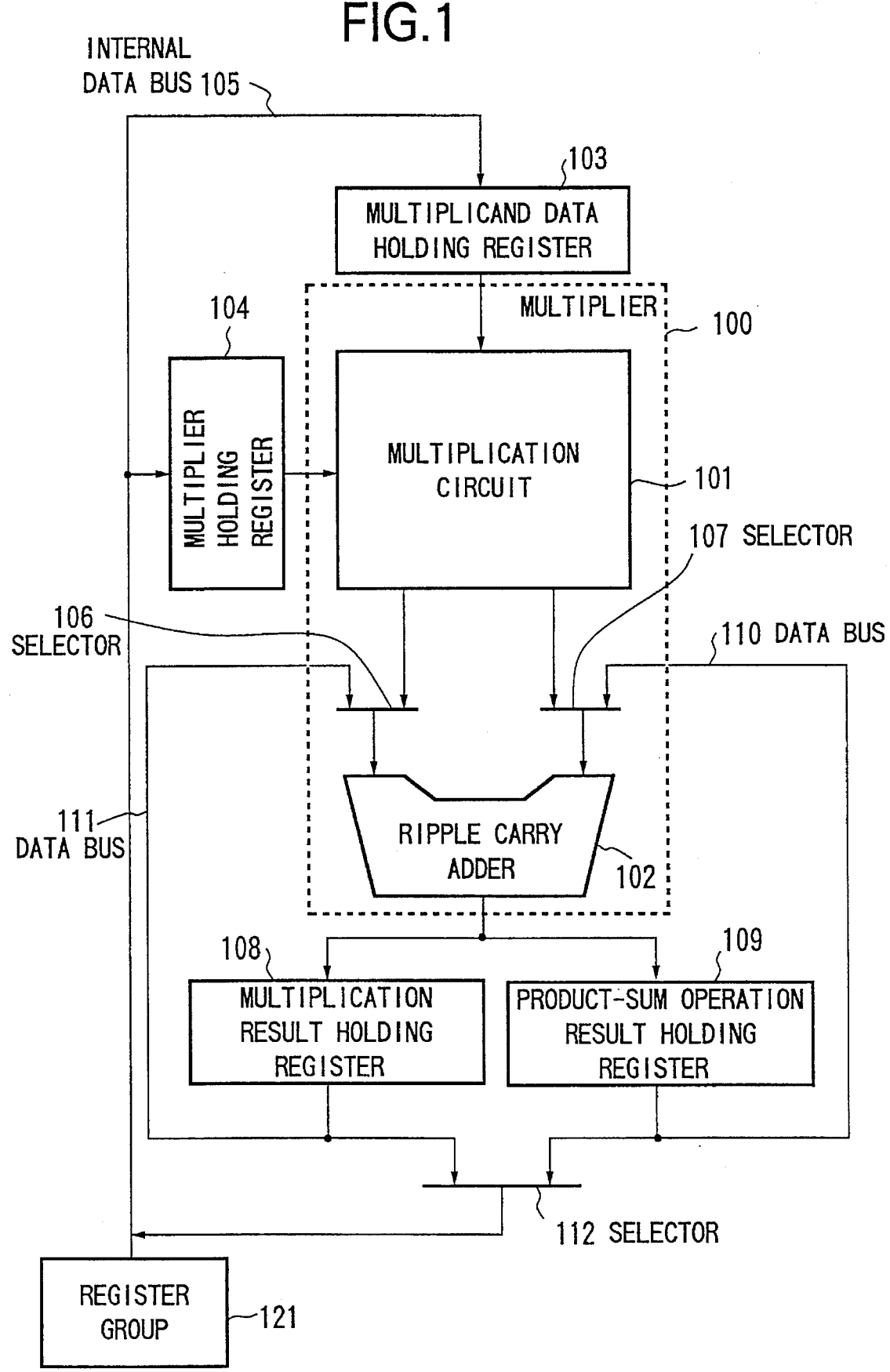
FIG. 1 is a block diagram to show the configuration of a microcomputer according to a first embodiment of the present invention.

Referring to the block diagram of FIG. 1 showing hardware configuration for the product-sum operation instruction, a first embodiment of the present invention is described first.

A microcomputer of the present invention comprises a multiplier 100 for multiplications and product-sum operations, a multiplicand data holding register 103, a multiplier data holding register 104, a multiplication result holding register 108, a product-sum operation result holding register 109, a selector 112 and a register group 121 including a plurality of registers. The multiplier 100 is provided with a multiplication circuit 101 using the carry save adder (CSA) method, a ripple carry adder 102 as the final step of the multiplier 100 and selectors 106 and 107 for selection of input to the ripple carry adder 102. A Booth decoder required for modification of the multiplicand data is included in the multiplication circuit 101.

The multiplication result holding register 108 and the product-sum operation result holding register 109 are connected to the selectors 106 and 107 via data buses 111 and 110 respectively. The selector 112, the multiplicand holding data register 103 and the multiplier holding register 104 are connected via a data bus 105.

In the conventional microprogram control, multiplication is made by determining partial products for the multiplicand data and repeatedly shifting them for 2 bits and adding them. In this embodiment, partial product determination, 2-bit shifting and addition of the partial products are made by the multiplication circuit 101 using the carry save adder method. The ripple carry adder 102 is a two-input adder.

As in the BACKGROUND OF THE INVENTION section above, it is assumed here that the data needed for operation such as multiplier and multiplicand data are read from the register group 121 having a plurality of registers via the internal data bus 105.

Also similarly to the BACKGROUND OF THE INVENTION section above, the multiplication processing is supposed to be made according to the secondary Booth algorithm and the data are supposed to have 16 bits.

The operation of a microcomputer with the above configuration is described now.

Firstly, a multiplicand data is written to the multiplicand data holding register 103 via the internal data bus 105. Then, a multiplier data is similarly written to the multiplier data holding register 104 via the internal data bus 105. The data written to the multiplicand data holding register 103 and the multiplier data holding register 104 are processed so that the eight partial products are added at the multiplication circuit 101 using the CSA method.

The data as a result of addition at the multiplication circuit 101 is selected by the selector 106 and the carry is selected by the selector 107 so that they are input to the ripple carry adder 102 in the final step.

For a multiplication instruction where a multiplicand data is multiplied by a multiplier data, the result of addition at the ripple carry adder 102 is output to the multiplication result holding register 108. The multiplication result M at the multiplication result holding register 108 is selected by the selector 112 and written to the register group 121 via the internal data bus 105.

On the other hand, for a product-sum operation instruction, the multiplication result M output from the ripple carry adder 102 in multiplication processing is output to the multiplication result holding register 108 and then input to the selector 106 via the data bus 111. The selector 107 receives the product-sum operation results S up to the previous processing are input from the product-sum operation result holding register 109 via the data bus 110. The selector 106 selects the multiplication result M at the multiplication result holding register 108 and the selector 107 selects the contents of the product-sum operation result holding register 109 so that the selected data are input to the ripple carry adder 102 for addition. The obtained addition result is, as a new product-sum operation result S, written to the product-sum operation result holding register 109.

Then, the next multiplicand data and the multiplier data are via the internal data bus 105 written to the multiplicand data holding register 103 and the multiplier holding register 104 so that eight partial products are added at the multiplication circuit 101. The addition result and the carry are selected by the selectors 106 and 107 and input to the ripple carry adder 102 for addition processing. The obtained multiplication result M is output to the multiplication result holding register 108 and sent to the selector 106 via the data bus 111. Similarly, to the selector 107, the product-sum operation result S obtained from the above product-sum operation at the product-sum operation result holding register 109 is sent via the data bus 110. These data are added at the ripple carry adder 102. The result is written to the product-sum operation result holding register 109.

Thereafter, by repeating the above procedure for the number of product-sum operations, the final product-sum operation result S is obtained at the product-sum operation result holding register 109. Such a final product-sum operation result S is selected by the selector 112 and written to the register group 121 via the internal data bus 105. Thus, a product-sum operation instruction is executed.

This embodiment is characterized by the multiplication circuit 101 using the carry save adder method which serves for partial product determination, 2-bit shifting and partial product addition. This reduces the number of clocks for execution to half or one third of that for a product-sum operation with microprogram control. Since all of the additional devices except the multiplication circuit 101 are simple ones such as selectors and registers and the bus configuration is the same as a conventional one, overhead due to addition of hardware can be minimized.

Figure 2:
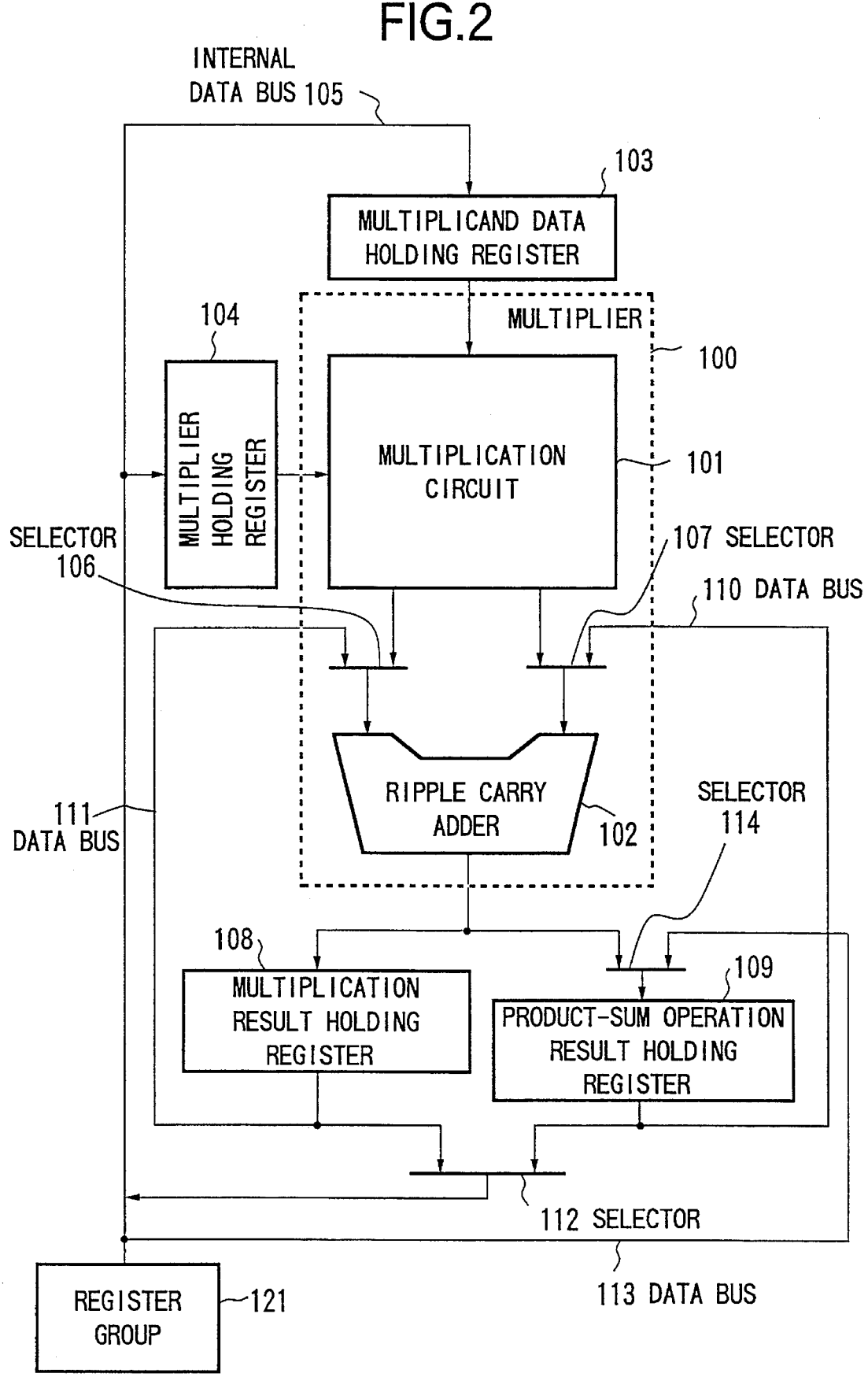
FIG. 2 is a block diagram to show the configuration of a microcomputer according to a second embodiment of the present invention.

Referring now to FIG. 2, a second embodiment of the present invention will be described below.

Since the basic configuration is the same as that in the first embodiment, the following description covers the difference between the first embodiment except that common parts are omitted.

In FIG. 2, a microcomputer of this embodiment is provided with a selector 114 between a ripple carry adder 102 and a product-sum operation result holding register 109. The selector 114 receives the output from the ripple carry adder 102 and the data sent via a data bus 113 connected with the internal data bus 105. The output from the selector 114 is sent to the product-sum operation result holding register 109.

As a result, the data input to the product-sum operation result holding register 109 is selected by the selector 114 and used as either of the data sent to the data bus 113 via the internal data bus 105 or the product-sum operation result S from the ripple carry adder 102.

Thus, provision of the data bus 113 and the selector 114 enables, in addition to storing of the product-sum operation result S at the product-sum operation result register 109, initial value setting and temporary storage of the intermediate result via the data bus 113. Temporary storage capability for the intermediate result helps resumption after suspension of operations.

Figure 3:
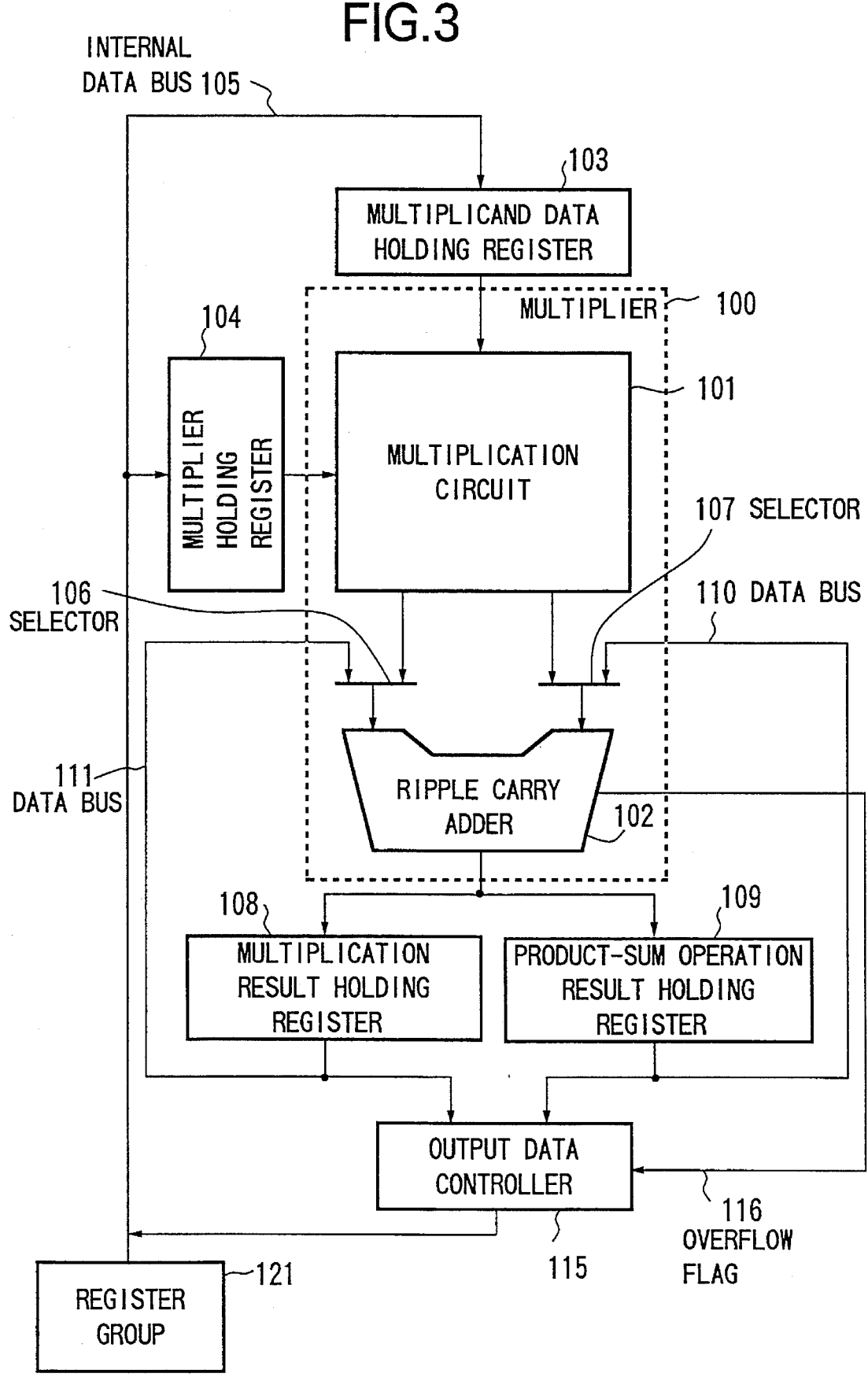
FIG. 3 is a block diagram to show the configuration of a microcomputer according to a third embodiment of the present invention.

FIG. 3 shows a third embodiment of the present invention. The basic configuration of this embodiment is the same as that in the first embodiment and the same reference numerals are given to the common parts. The description below covers differences from the first embodiment only, thereby omitting description for common parts. In FIG. 3, the selector 112 in FIG. 1 is replaced with an output data controller 115, which receives an overflow flag 116 sent from the ripple carry adder 102.

Operations under a multiplication instruction using the secondary Booth algorithm and under a product-sum operation instruction are the same as in the first embodiment shown in FIG. 1. Specifically, a multiplication instruction causes the result of addition at the ripple carry adder 102 to be output to the multiplication result holding register 108 and written to the register group 121 from the output data controller 115 via the internal data bus 105.

For a product-sum operation instruction, the multiplication result M at the multiplication result holding register 108 is selected by the selector 106 and the product-sum operation result S at the product-sum operation result holding register 109 is selected at the selector 107 respectively, so that they are input to the ripple carry adder 102 for addition. The obtained addition result is written to the product-sum operation result holding register 109. By repeating the above procedure for the number of product-sum operations, the final product-sum operation result M is obtained at the product-sum operation result holding register 109. The product-sum operation result M is written from the output data controller 115 to the register group 121 via the internal data bus 105.

Figure 4:
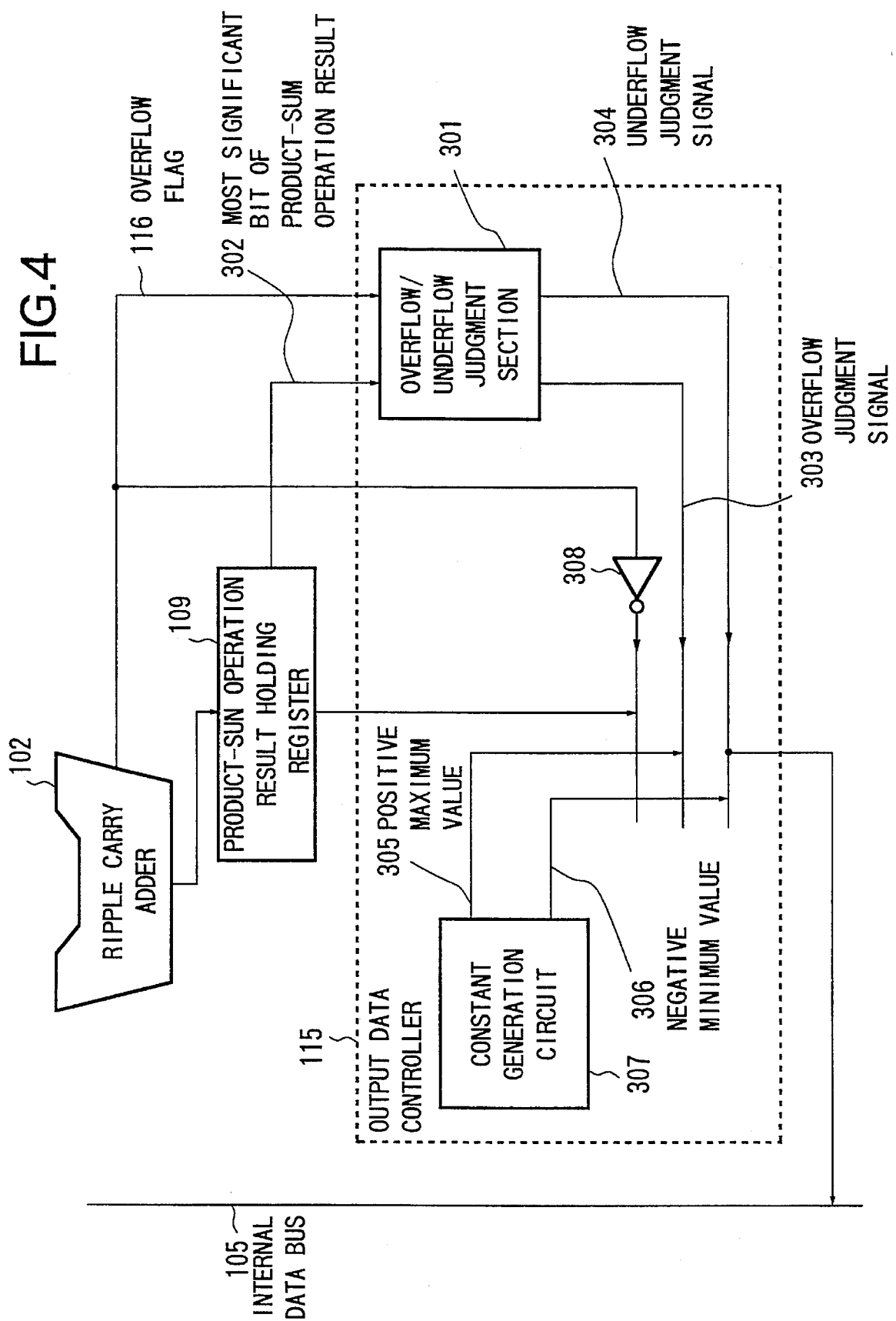
FIG. 4 is a block diagram to show the configuration of an output data controller according to the third embodiment as shown in FIG. 3.

FIG. 4 shows the configuration of the above output data controller 115. In the figure, the output data controller 115 is provided with an overflow/underflow judgment section 301 which receives the overflow flag 116 from the ripple carry adder 102 and the most significant bit 302 from the product-sum operation result holding register 109 and judges whether the product-sum operation overflows or underflows, a constant generation circuit 307 which selectively outputs the positive or negative maximum value of the operation word length and an inverter 308.

The operation of the output data controller 115 is described now. As in the first embodiment, it is supposed here that the multiplier and the multiplicand data have 16 bits and the operation result has 32 bits.

For execution of a product-sum operation instruction, the selector 106 selects the multiplication result M at the multiplication result holding register 108 and the selector 107 selects the product-sum operation result S at the product-sum operation result holding register 109 so that these results are input to the ripple carry adder 102 for addition. The ripple carry adder 102 sets the overflow flag 116 to "1" when either of the carry from the 32nd bit or the carry from the 31st bit to the 32nd bit is "1", and sets the overflow flag 116 to "0" for other cases. The addition result obtained at the ripple carry adder 102 is held at the product-sum operation result holding register 109 as it is.

When the overflow flag 116 is "0", the output data controller 115 writes the final product-sum operation result S at the product-sum operation result holding register 109 to the register group 121 via the internal data bus.

When the overflow flag 116 is "1", the output data controller 115 has its overflow/underflow judgment section 301 judge the most significant bit 302 of the product-sum operation result S held at the product-sum operation result holding register 109. When the most significant bit 302 of the product-sum operation result S is "1", the overflow/underflow judgment section 301 judges that an overflow occurs for the product-sum operation result S and sets the overflow judgment signal 303 to "1". When the most significant bit 302 of the product-sum operation result S is "0", it judges that an underflow occurs for the product-sum operation result S and outputs "1" for the underflow judgment signal 304.

When the overflow judgment signal 303 is "1", the output data controller 115 outputs the positive maximum value 305

(7FFFFFFF for 32-bit operation word length) selected from the constant generation circuit 307. When the underflow judgment signal 304 is "1", it outputs the negative maximum value 306 (80000000 for 32-bit operation word length) selected from the constant generation circuit 307. Such positive and the negative maximum values are generated at the constant generation circuit 307 in advance.

When the overflow flag 116 is "1", the inverter 308 masks the product-sum operation result S of the product-sum operation result holding register 109 to prevent it from being output. Instead, the above positive or negative maximum value is output to the internal data bus.

Thus, in this embodiment, provision of the output data controller 115 as described above realizes the saturation function for product-sum operations (function to generate the maximum value of the operation result when an overflow or underflow occurs during operation).

Figure 5:
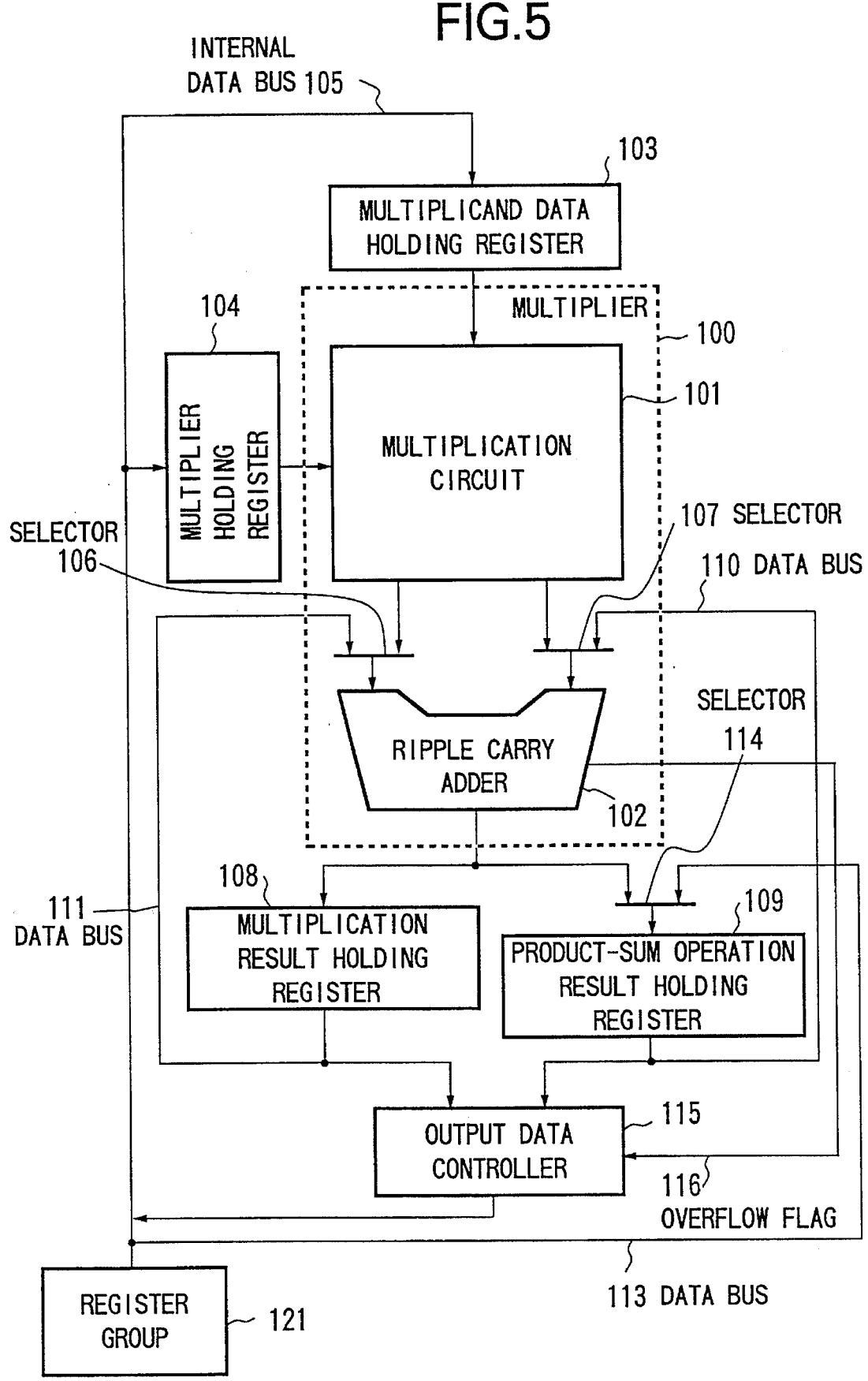
FIG. 5 is a block diagram to show the configuration of a microcomputer according to a fourth embodiment of the present invention.
Figure 6:
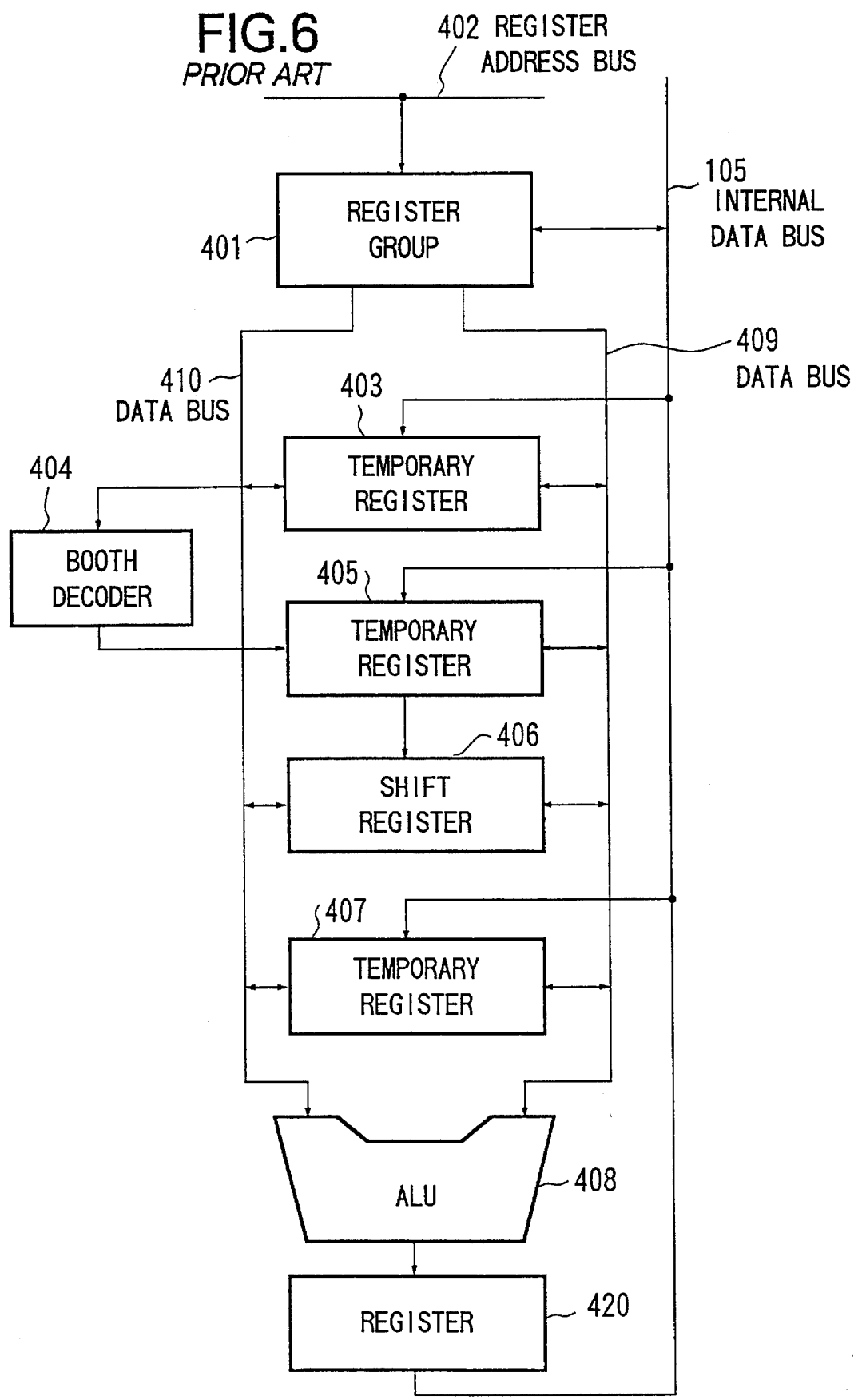
FIG. 6 is a block diagram to show the configuration of a conventional microcomputer.

FIG. 5 shows a fourth embodiment of the present invention. According to this embodiment, a microcomputer has a configuration where a selector 114 and a data bus 113 similar to those in the second embodiment are added to the configuration shown in FIG. 4. Its operation is the same as the second and the third embodiments and thus the description is omitted. The fourth embodiment enables, in addition to the above saturation function for product-sum operations, initial value setting and temporary storage of intermediate result to the product-sum operation result holding register 109 via the data bus 113. This capability is helpful for resumption after suspension of operations, for example.

Obviously, various modifications can be made to the above embodiments. It is intended to cover in the appended claims all such modifications and variations as fall within the true spirit and scope of the present invention.

What is claimed is:

1. A microcomputer comprising:

a multiplication circuit for executing multiplication of a multiplier and a multiplicand data;

a ripple carry adder for executing addition of a data and a carry from said multiplication circuit as well as addition of multiplication results;

first holding means for holding the multiplication result obtained by said addition of the carry and the data at said ripple carry adder;

second holding means for holding a product-sum operation result obtained by addition of the multiplication results from said ripple carry adder;

first selection means for selectively inputting the carry or the data from said multiplication circuit and the multiplication result held at said first holding means to said ripple carry adder;

second selection means for selectively inputting the carry or data from said multiplication circuit and the product-sum operation result held at said second holding means to said ripple carry adder; and output data control means for selectively outputting the multiplication result or the product-sum operation result held at said first holding means or said second holding means, wherein said multiplication circuit comprises a plurality of carry save adders for executing addition processing other than a last addition for multiplication, said ripple carry adder for executing the last addition of the data and the carry from said multiplication circuit for multiplication, said output dam control means comprising judgment means for judging whether the product-sum operation result in said second holding means overflows or underflows so as to output the product-sum operation result at said second holding means when said judgment means judges that neither an overflow nor an underflow occurs for said product-sum operation result.

2. A microcomputer of claim 1 wherein said output data control means comprises a selector.

3. A microcomputer of claim 1 further comprising third selection means between said ripple carry adder and said second holding means for selectively storing the product-sum operation result from said ripple carry adder or the data from an internal data bus to said second holding means.

4. A microcomputer comprising:

a multiplication circuit for executing multiplication of a multiplier and a multiplicand data;

a ripple carry adder for executing addition of a data and a carry from said multiplication circuit as well as addition of multiplication results;

first holding means for holding a multiplication result obtained by said addition of the carry and the data at said data in said ripple carry adder;

second holding means for holding a product-sum operation result obtained by addition of the multiplication results from said ripple carry adder;

first selection means for selectively inputting the carry or the data from said multiplication circuit and the multiplication result held at said first holding means to said ripple carry adder;

second selection means for selectively inputting the carry or data from said multiplication circuit and the product-sum operation result held at said second holding means to said ripple carry adder; and output data control means selectively outputting the multiplication result or the product-sum operation result held at said first holding means or said second holding means, wherein said multiplication circuit comprises a plurality of carry save adders for executing addition processing other than a last addition for multiplication, said ripple carry adder for executing the last addition of the data and the carry from said multiplication circuit for multiplication, said output data control means comprising judgment means for judging whether the product-sum operation result in said second holding means overflows or underflows, so as to output the product-sum operation result at said second holding means when said judgment means judges that neither an overflow nor an underflow occurs for said product-sum operation result, a positive maximum value for an operation word length when an overflow occurs and a negative maximum value for the operation word length when an underflow occurs.

5. A microcomputer of claim 4 wherein said judgment means of said output data control means receives an overflow flag from said ripple carry adder and, if the overflow flag is "1", judges that an overflow occurs when the most significant bit of the product-sum operation result in said second holding means is "1" and that an underflow occurs when the most significant bit of the product-sum operation result in said second holding means is "0".

6. A microcomputer of claim 4, wherein said judgment means of said output data control means receives an overflow flag from said ripple carry adder.

7. A microcomputer of claim 4 further comprising a constant generation circuit which generates the positive or negative maximum value for said operation word length in advance.

8. A microcomputer of claim 4 further comprising third selection means between said ripple carry adder and said second holding means to selectively store the product-sum operation result from said ripple carry adder or the data from the internal data bus to said second holding means.

9. A microcomputer of claim 4 further comprising third selection means for selectively storing the product-sum operation result from said ripple carry adder or the data from the internal data bus to said second holding means.

10. A microcomputer of claim 5 further comprising means for masking the output of the product-sum operation result of said second holding means when said overflow flag is "1".

11. A microcomputer of claim 6 further comprising means for masking the output of the product-sum operation result of said second holding means when said overflow flag is "1".

* * * * *